United States Patent [19]

Zucker

[11] Patent Number: 5,090,790
[45] Date of Patent: Feb. 25, 1992

[54] POLARIZATION-INDEPENDENT SEMICONDUCTOR WAVEGUIDE

[75] Inventor: Jane E. Zucker, Aberdeen, N.J.

[73] Assignee: AT&T Bell Laboratories, Murray Hill, N.J.

[21] Appl. No.: 546,321

[22] Filed: Jun. 29, 1990

[51] Int. Cl.$^5$ ............... H01L 29/205; H01L 29/14; G02B 6/12; G02B 5/30

[52] U.S. Cl. ........................ 385/130; 357/4; 357/16; 359/246; 359/483; 385/8; 385/14

[58] Field of Search ............ 357/4, 16; 350/370, 350/96.12, 96.11, 96.14, 386

[56] References Cited

U.S. PATENT DOCUMENTS 4,952,792  8/1990  Caridi ........................ 357/4

OTHER PUBLICATIONS

O. Sahlen et al., 1990 International Topical Meeting on Photonic Switching, Apr. 1990, "Bandfilling or Stark Effect for . . . ", pp. 25–27.

Physics and Applications of Quantum Wells & Superlattices, ed. E. E. Mendez, K. von Klitzing, pp. 265–267.

K. B. Kahen et al., Appl. Phys. Lett., 49 (12), Sep. 22, 1986, "Exciton effects in the index of refraction . . . ", pp. 734–736.

K. B. Kahen et al., Phys Rev. B., vol. 33, No. 8, Apr. 15, 1986, "Optical constants of GaAs-Al$_x$Ga$_{1-x}$ . . . ", pp. 5465–5472.

P. Melman et al., Appl. Phys. Lett., 55 (14), Oct. 2, 1989, "InGaAs/GaAs strained quantum wells with . . . ", pp. 1436–1438.

E. Bigan et al., Elec. Lett., vol. 26, No. 6, Mar. 15, 1990, "Strained-Layer InGaAs/InAlAs Multiple Quantum Wells . . . ", pp. 355–357.

A. R. Adams, Elec. Lett., vol. 22, No. 5, Feb. 27, 1986, "Band-Structure Engineering for Low-Threshold . . . ", pp. 249–250.

H. Kato et al., Japanese J. of Appl. Phys., vol. 25, No. 9, Sep. 1986, "Effective Mass Reversal on . . . ", pp. 1327–1331.

D. A. Dahl, Solid State Commun., vol. 61, No. 12, 1987, "Strain Effects in InGaAs/HaAs Superlattices", pp. 825–826.

R. People, Appl. Phys. Lett., 50 (22), Jun. 1, 1987, "Effects of Coherency Strain on the Band Gap . . . ", pp. 1604–1606.

D. Gershoni et al., Phys. Rev. B., vol. 39, No. 8, Mar. 15, 1989, "Excitronic transitions in strained-layer . . . ", pp. 5531–5534.

D. Gershoni et al., Phys. Rev. Lett., vol. 60, No. 5, Feb. 1, 1988, "Type-I to Type-II Superlattice Transition . . . ", pp. 448–451.

D. Gershoni et al., Phys. Rev. B., vol. 36, No. 2, Jul. 15, 1987, "Electronic Energy Levels in In$_x$Ga$_{1-x}$As/InP . . . ", pp. 1320–1323.

J. E. Zucker et al., Appl. Phys. Lett., 52 (12), Mar. 21, 1988, "Electro-optic phase modulation in GaAs/AlGaAs . . . ", pp. 945–947.

J. E. Zucker et al., Appl. Phys. Lett., 55 (22), Nov. 27, 1989, "Compact directional coupler switches using quantum . . . ", pp. 2280–2282.

J. E. Zucker et al., Appl. Phys. Lett., 56 (20), May 14, 1990, "Optical waveguide intensity modulators based on a tunable . . . ", pp. 1951–1953.

J. E. Zucker et al., IEEE Photonics Tech. Lett., vol. 2, No. 1, Jan. 1990, "Miniature Mach-Zender InGaAsP Quantum Well . . . ", pp. 32–34.

*Primary Examiner*—Jerome Jackson, Jr.
*Attorney, Agent, or Firm*—Gregory C. Ranieri

[57] ABSTRACT

A polarization independent guided wave semiconductor device is realized wherein the waveguide region of the device includes one or more strained quantum well layers wherein strain is designed to be tensile in nature so that energy subbands in the quantum well or wells are displaced by a predetermined amount in a direction opposite to that for the quantum size effect. Polarization independence is achieved when, for a lightwave signal having an incident mean photon energy below the absorption bandedge of the strained quantum well layer or layers, the ratio of the oscillator strengths versus the wavelength detuning for heavy and light holes in a first polarization (TE) is substantially equal to a similar ratio computed in a second polarization (TM). Wavelength detuning is understood to be the difference between the wavelength of operation and the wavelength of an exciton resonance peak. Passive and active or actively controllable waveguides and waveguide devices are described.

11 Claims, 2 Drawing Sheets

POLARIZATION-INDEPENDENT SEMICONDUCTOR WAVEGUIDE

TECHNICAL FIELD

This invention relates to semiconductor devices and, more particularly, to devices including an optical waveguide.

BACKGROUND OF THE INVENTION

Polarization sensitivity is a dominant characteristic in present guided wave optical devices. When presented with lightwave signals in different directions of wave polarization such as TE and TM, guided wave optical devices tend to respond differently. In general, this problem arises because each orthogonal polarization experiences different optical properties in the guided wave device such as refractive index, absorption, and changes of these quantities and the like when the device is subjected to an applied field.

This problem is better understood in terms of present optical communication systems in which, for most applications, standard single-mode optical fibers transport lightwave signals from point-to-point. Single-mode optical fibers may be polarization preserving or polarization non-preserving. The latter variety of fiber is widely used because of its lower cost and ease of manufacture. Unfortunately, such fibers do not preserve any particular direction of polarization for the lightwave signals carried by the fiber. As a result, linearly polarized lightwave signals applied at the input end of the fiber emerge at the output end of the fiber in an arbitrary elliptical polarization which varies with time. Under these circumstances, a single polarization guided wave device such as a switch would yield unacceptably high crosstalk and loss due to polarization sensitivity whenever the received lightwave signal exhibits a polarization different from the polarization expected by the switch.

Polarization sensitivity has been effectively handled in directional coupler devices fabricated from birefringent materials such as lithium niobate and lithium tantalate. In such directional coupler devices, two different approaches have been successfully applied. First, a number of guided wave elements have been combined to realize a guided wave device which is polarization independent while the guided wave elements individually exhibit polarization sensitivity. See, for example, a tunable wavelength filter in U.S. Pat. No. 4,390,236. Polarization insensitivity (independence) has also been achieved where the guided wave device is designed having a specialized waveguide geometry for use over an appropriate operating regime. See, for example, a directional coupler switch/modulator in U.S. Pat. No. 4,243,295. Clearly, these approaches influence the birefringence of the waveguide material by external means without attempting or even suggesting the desirability of attempting to change the birefringence intrinsic to the waveguide material.

For semiconductor devices, semiconductor waveguide structures have been realized using one or more quantum wells in the main guiding region. Quantum wells are particularly attractive for semiconductor device structures because they are operable at low voltage which is important in switching and modulation applications and they permit fabrication of relatively compact structures so that comparatively large optical and electrooptic effects are achieved over a short interaction length. See, for example, an electrorefraction directional coupler switch in *Appl. Phys. Lett.*, 55 (22), pp. 2280-2 (1989) and a phase modulator in *Appl. Phys. Lett.*, 52 (12), pp. 945-7 (1988). However, semiconductor quantum well waveguide structures have anisotropic optical properties for different polarizations of lightwave signals propagating in the waveguide at a given wavelength. See the latter reference cited above at FIGS. 1 through 4 therein. This anisotropy arises because the superlattice potential splits the valence band degeneracy thereby creating two separate exciton valence bands, namely, a light hole exciton valence band and a heavy hole exciton valence band. Selection rules for band splitting are described in "Physics and Applications of Quantum Wells and Superlattices," (E. Mendez and K. von Klitzing ed. 1987). Lightwave signals polarized in the plane of the quantum well layers (TE) experience different optical effects than orthogonal lightwave signals which are polarized perpendicular to the plane of the quantum well layers (TM). Published articles have shown that band splitting and, therefore, polarization dependent effects such as absorption occur for lattice matched (unstrained) quantum well layers as well as for lattice mismatched (strained) quantum well layers. See, for example, *Phys. Rev. Lett.*, Vol. 60, Number 5, pp. 448-51 (1988). Presently, there has been no known effort to alleviate the difficulties of polarization dependence in semiconductor quantum well waveguide devices.

SUMMARY OF THE INVENTION

Polarization sensitivity is substantially eliminated and polarization independence is achieved in a guided wave semiconductor quantum well device wherein a waveguiding region includes one or more strained quantum well layers for supporting propagation of orthogonally polarized lightwave signals. The strain is designed to be tensile in nature so that the energy subbands are displaced in a direction opposite to that for the quantum size effect. Polarization independence is achieved when, for a lightwave signal having an incident mean photon energy below the absorption bandedge of the strained quantum well layer or layers, the ratio of the oscillator strengths versus the wavelength detuning for heavy and light holes in a first polarization (TE) is substantially equal to a similar ratio computed in a second polarization (TM). Wavelength detuning is understood to be the difference between the wavelength of operation and the wavelength of an exciton resonance peak.

In one embodiment, a polarization independent passive optical waveguide structure is realized in accordance with the principles of the invention so that the effective refractive index of the waveguide for a TE-polarized lightwave signal having a mean photon energy below the absorption bandedge of the quantum well is substantially equal to the effective refractive index of the waveguide for a TM-polarized lightwave signal having a substantially identical mean photon energy below the absorption bandedge of the quantum well. It is understood that waveguide geometry and material composition for the waveguide core and cladding regions are incorporated into the balancing of effective refractive indices.

In another embodiment, a polarization independent electrooptical waveguide structure is realized in accordance with the principles of the invention so that over a contemplated operating regime a desired electrooptic property of the waveguide for a TE-polarized lightwave signal having a mean photon energy below the absorption bandedge of the quantum well is substantially equal to the desired electrooptic property of the waveguide for a TM-polarized lightwave signal having a substantially identical mean photon energy below the absorption bandedge of the quantum well. Electrooptic properties are understood to be refractive index change (electro-refraction), absorption change (electro-absorption), and carrier-induced gain.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
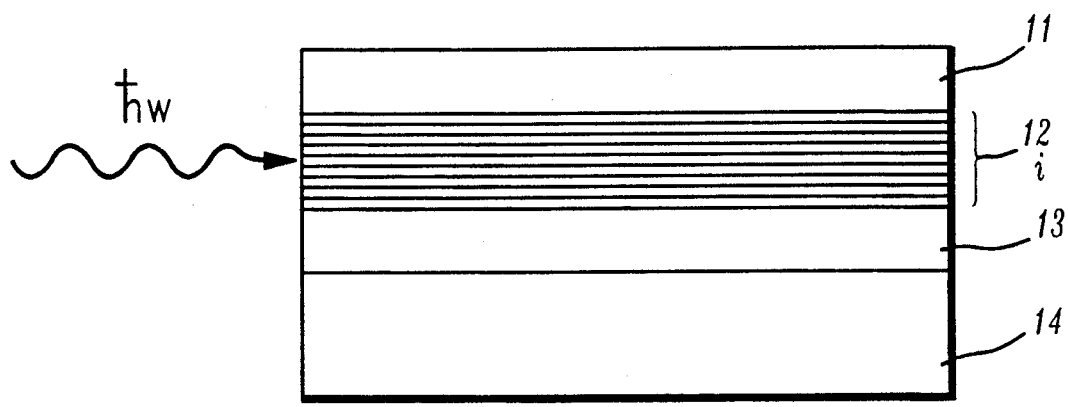
FIG. 1 is a cross-sectional schematic diagram of an exemplary passive waveguide device in accordance with the principles of the invention.

Various exemplary embodiments of the invention shown in the drawing have not been drawn to scale and are merely for purposes of illustration and not limitation. Exemplary dimensions of the semiconductor layers shown in the drawing are stated hereinbelow.

The present invention affords designers and developers many interesting alternatives for passive and active or actively controllable polarization independent device structures which may be included in opto-electronic integrated circuits and photonic integrated circuits. While many different waveguide structures and device structures are possible, the description below focuses primarily on a slab waveguide structure having a waveguiding region surrounded at least on top and bottom surfaces by appropriate cladding regions. It should be noted that the devices and structures presented below are merely for purposes of illustration and not for purposes of limitation. It is contemplated that the present invention is applicable to waveguide structures such as strip-loaded waveguides, rib waveguides, buried rib waveguides, and the like wherein horizontally and vertically transverse optical modes of the propagating lightwave signals are effectively confined.

Passive waveguide devices utilize optical properties such as refractive index and absorption to achieve a desired purpose. When it is desired to vary the optical path length of the waveguide to achieve a known phase modulation or phase shift, for example, it is necessary to apply either an electrical or optical field to the waveguide to induce the change via an electrooptic effect. From the aspects of the present invention, it will be understood that it is not only possible to substantially match optical properties at a particular propagation wavelength for orthogonal polarizations but it is also possible to substantially match electrooptic properties at a particular propagation wavelength for orthogonal polarizations. With respect to the latter condition, it is expected that a waveguide device realized in accordance with the principles of the present invention will be capable of exhibiting substantially equal amounts of change for the desired electrooptic property in each polarization when subjected to an electromagnetic field. Exemplary waveguide devices based upon absorption changes include optical intensity modulators. Exemplary waveguide devices based upon refractive index changes include directional coupler switches and modulators, intersecting waveguide switches and modulators, interferometric waveguide intensity modulators, tunable filters, electro-refractive phase modulators, and intracavity tuning elements in semiconductor lasers. Exemplary waveguide devices based upon gain include semiconductor lasers and semiconductor amplifiers either alone or included as some other part of photonic integrated circuit. Exemplary passive waveguide devices include waveguide interconnects, Y-branches, and bends.

FIG. 1 shows a cross-section through the longitudinal axis for a typical quantum well waveguide structure realized in accordance with the principles of the invention. Major components of the semiconductor waveguide structure include upper cladding region 11, lower cladding region 13, and core waveguiding region 12 wherein the propagating modes of the lightwave signal are substantially confined to the core region and the core (waveguiding) region is surrounded at least on the top and bottom surfaces by the appropriate cladding regions. The component regions of the waveguide structure are shown as epitaxial layers over a semiconductor substrate 14. Light having a mean photon energy $\hbar\omega_p$ which is below the absorption band edge energy of the quantum well impinges on the device in a direction parallel to the longitudinal axis of the waveguide region. A waveguiding condition is achieved when the refractive index for the core waveguiding region exceeds the refractive index for the cladding regions.

Figure 2:
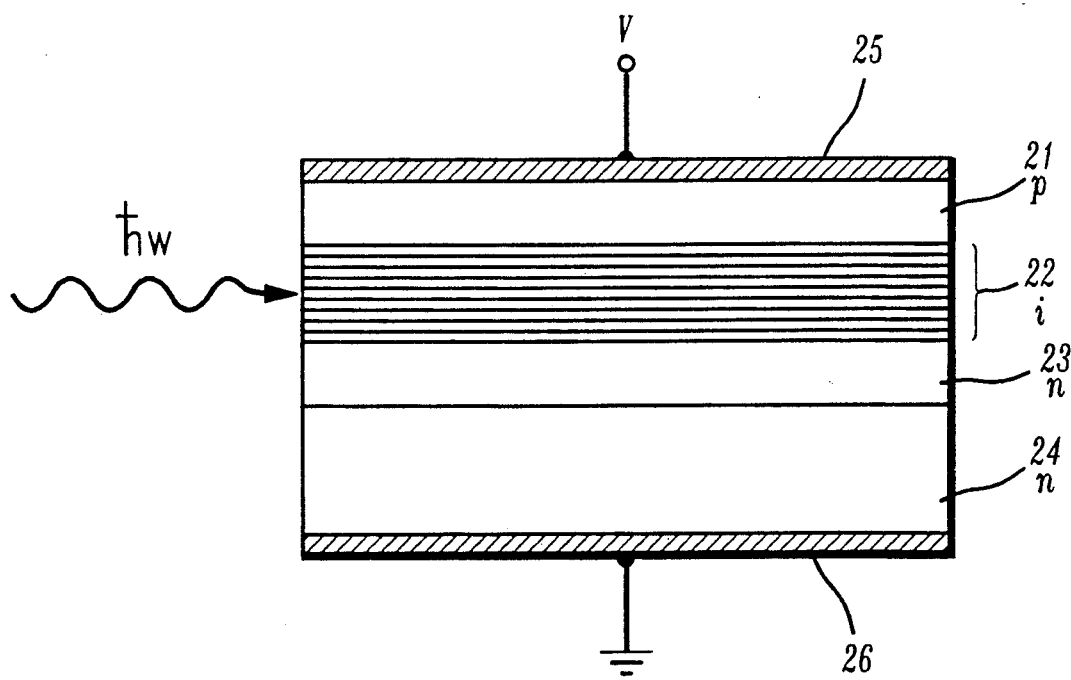
FIG. 2 is a cross-sectional schematic diagram of an exemplary electrooptic waveguide device in accordance with the principles of the invention.

When employed in a device as an active waveguide as shown in FIG. 2, it is desirable to dope at least some portion of the semiconductor material in each cladding region while maintaining an intrinsic or nominally undoped core region. Doped structures are generally employed to cause a field to be applied directly to the core region. It should be clear to those skilled in the art that both doped and undoped cladding regions are suitable for use in passive waveguide structures.

For the device shown in FIG. 1, core waveguiding region 12 comprises one or more strained quantum well layers. Generally, the core waveguiding region is intrinsic or nominally undoped. In an exemplary embodiment, the core waveguiding region comprises ten periods of the following undoped layer structure: a 70 Å $In_xGa_{1-x}As$ quantum well layer and a 100 Å InP barrier layer. Lower and upper cladding layers are n-doped and p-doped InP, respectively. The substrate is also n-doped InP. Typical thicknesses for the substrate and upper and lower cladding regions are generally on the order of 1000 Å. Using these compositions, the refractive index of the core region is higher than the refractive indices of both cladding regions to provide confinement of the optical modes at the propagation wavelength $\lambda_p$ within the waveguiding region. It should be noted again that the propagation wavelength is selected to correspond to a mean photon energy $\hbar\omega_p$ which is below the absorption bandedge of the quantum well material comprising the core region.

The waveguide device may be fabricated by standard epitaxial processing techniques such as molecular beam epitaxy and vapor phase epitaxy such as metal organic chemical vapor deposition. Fabrication techniques including semiconductor layer growth, impurity doping, atomic planar layer or delta impurity doping, photolithography and contact metallization to realize a device in accordance with the principles of the invention described above are believed to be well known to those persons of ordinary skill in the art.

In order to achieve a condition of polarization independence for the waveguide structure, it is necessary to introduce a predetermined amount of strain in the quantum well layer or layers of the core waveguiding region. Strain is understood to be biaxial in the growth plane and to encompass both tension and compression. For tension, it is understood that the lattice constant of the strained layer is smaller than the lattice constant of the substrate material for the device. For compression, it is understood that the lattice constant of the strained layer is larger than the lattice constant of the substrate material for the device. When a tensile stress is employed in the waveguide structure, the energy subbands are displaced in a direction opposite to that for the quantum size effect. Polarization independence is achieved when, for a lightwave signal having an incident mean photon energy below the absorption bandedge of the strained quantum well layer or layers, the ratio of the oscillator strengths versus the detuning for heavy and light holes in a first polarization (e.g., TE) is substantially equal to a similar ratio computed in a second polarization (e.g., TM).

Introduction of strain by changing the lattice constant and, therefore, the degree of lattice mismatch for a composition such as $In_xGa_{1-x}As$ are created by varying the mole fraction x, that is, the relative concentration of one or more elements in the composition. The amount of strain induced by the lattice mismatch is carefully selected to control the resulting optical and electrooptic properties for orthogonal modes propagating in the waveguide at the wavelength of operation $\lambda_p$ corresponding to a mean photon energy $\hbar\omega_p$. Optical and electrooptic properties include refractive index, absorption, gain, and changes of index or absorption. It will be explained in more detail below that the strain is intended to carefully achieve a desired balance between oscillator strength and detuning for each polarization at the propagation wavelength.

While lattice mismatching is defined above with respect to the substrate, it is understood by those skilled in the art that mismatching of lattice constants can be defined more generally with respect to any layer. It is further understood that additional strain may be introduced through barrier material which is different from the underlying substrate material. In the latter case, the strain introduced by barrier material may also be of the type which is opposite to the strain introduced by the quantum well material thereby allowing an indefinitely thick core region to be fabricated ("strain symmetrization").

FIG. 2 shows an active or actively controllable waveguide device incorporating upper and lower cladding regions 21 and 23, respectively, in combination with a core waveguiding region 22. The waveguide structure is grown on substrate 24 and is controlled via metallic contacts 25 and 26. An electrical potential is applied to contact 25 while contact 26 is grounded. For the example shown in FIG. 2, contact 26 may be formed on the n-substrate by using an alloyed stack comprising layers of gold, nickel, and gold-germanium. Contact 25 may be formed as a stripe contact on p-region 21 using an alloyed stack comprising layers of gold, gold-zinc and chromium. Semiconductor regions 21 through 24 correspond in composition and thickness to the similar regions in the device shown in FIG. 1. Doping concentrations are contemplated in the range of $10^{17}$ cm$^{-3}$ to approximately $10^{18}$ cm$^{-3}$. Ohmic contacts for such p-i-n structures are formed by standard techniques including evaporative deposition and alloying of metals.

Figure 3:
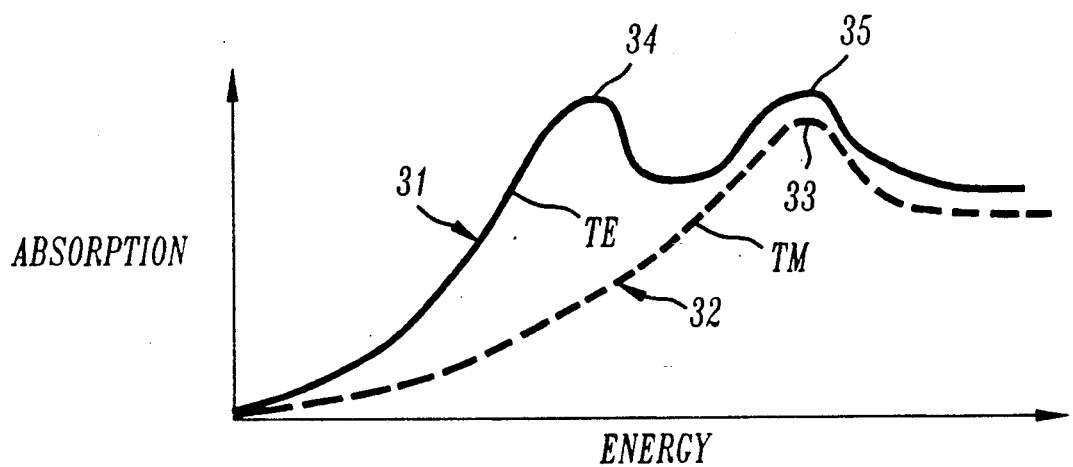
FIGS. 3 and 4 are graphical illustration of polarization dependent absorption effects for unstrained and strained semiconductor quantum wells.
Figure 4:
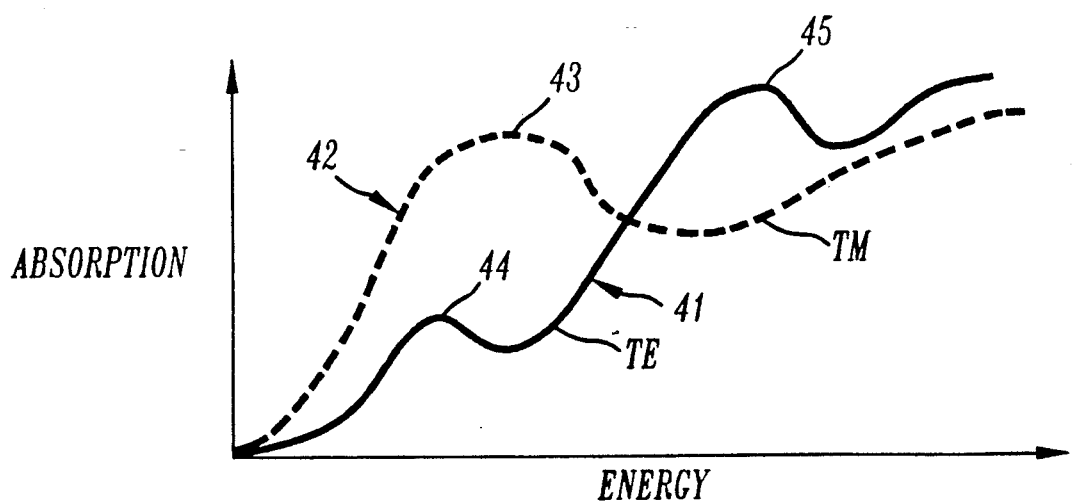

FIGS. 3 and 4 show graphical illustrations of absorption ($\alpha$) versus incident photon energy ($\hbar\omega$) for each of two orthogonal polarizations, namely, TE and TM, for a waveguide structure similar to that shown in FIG. 1. In FIG. 3, the mole fraction x equals 0.53 for InGaAs quantum wells, which corresponds to a lattice-matched condition for the quantum well with respect to the InP substrate. For curve 31, which corresponds to the TE polarization, a peak 34 at energy $\hbar\omega_{hh,TE}$ represents the TE absorption contribution from heavy holes whereas the peak 35 at $\hbar\omega_{lh,TE}$ represents the TE absorption contribution from light holes. For curve 32, which corresponds to the TM polarization, a peak 33 at $\hbar\omega_{lh,TM}$ represents the TM absorption contribution from light holes. It should be noted that there is no contribution from heavy holes for the TM polarization. The corresponding oscillator strengths, namely, $f_{lh}$ and $f_{hh}$, are determined from the peak values shown on curves 31 and 32. For the unstrained device whose absorption characteristic is shown in FIG. 3, it has been determined that the anisotropy is sufficient to cause the waveguide to be polarization dependent, that is, both optical and electrooptic properties are significantly different for TE and TM polarizations at the wavelength of operation. The anisotropy is evident from a comparison of the ratios of oscillator strengths to detuning for TE ($\approx 2.45$) and TM ($\approx 1.75$) polarizations.

In contrast to FIG. 3, FIG. 4 shows the absorption as an incident of photon energy for the case of strained InGaAs quantum wells with the mole fraction x approximately equal to 0.3 in a waveguide structure similar to that shown in FIG. 1 or 2. The mole fraction insures a lattice-mismatched condition between the InGaAs quantum wells and the InP substrate. For curve 41, which corresponds to the TE polarization, a peak 44 at energy $\hbar\omega_{lh,TE}$ represents the TE absorption contribution from light holes whereas the peak 45 at $\hbar\omega_{hh,TE}$ represents the TE absorption contribution from heavy holes. For curve 42, which corresponds to the TM polarization, a peak 43 at $\hbar\omega_{lh,TM}$ represents the TM absorption contribution from light holes. It should again be noted that there is no contribution from heavy holes for the TM polarization. The corresponding oscillator strengths, namely, $f_{lh}$ and $f_{hh}$, are determined from the peak values shown on curves 41 and 42. For the strained device whose absorption characteristic is shown in FIG. 4, it has been determined that the anisotropy is controlled and substantially eliminated so that the waveguide is polarization independent, that is, both optical and electrooptic properties are substantially identical for TE and TM polarizations at the wavelength of operation. Control of the anisotropy is evident from a comparison of the ratios of oscillator strengths to detuning for TE ($\approx 3.2$) and TM ($\approx 3.8$) polarizations.

From FIGS. 3 and 4, it is apparent that quantum well strain in the waveguide structure is capable of altering the relative positions of light and heavy hole bands. However, the excitonic nature of absorption which is advantageous for optical and electro-optic devices and the symmetry character of light and heavy holes remains substantially unchanged in the presence of strain. Accordingly, it is possible to vary the detuning without disturbing the oscillator strengths. It is again noted that detuning is measured as the frequency ($\omega$) or wavelength ($\lambda$) difference between the frequency or wavelength of operation and the frequency or wavelength of a light hole or a heavy hole peak in the absorption curves.

It is understood by those skilled in the art that the ratio of the oscillator strength to the detuning is proportional to important optical and electro-optic properties such as refractive index (n), absorption ($\alpha$), refractive index change ($\Delta n$), absorption change ($\Delta n$), and gain. That is, (n, $\alpha, \Delta\alpha, \Delta n$, g) in the TE polarization are each proportional to the sum $$\frac{f_{lh,TE}}{\Delta\omega_{lh,TE}} + \frac{f_{hh,TE}}{\Delta\omega_{hh,TE}}$$

A similar expression of proportional can be written for the TM polarization. To achieve complete polarization independence, it is now understood that the strain must be sufficient to have, $$\frac{f_{lh,TE}}{\Delta\omega_{lh,TE}} + \frac{f_{hh,TE}}{\Delta\omega_{hh,TE}} \approx \frac{f_{lh,TM}}{\Delta\omega_{lh,TM}} + \frac{f_{hh,TM}}{\Delta\omega_{hh,TM}}$$

Viewing FIGS. 3 and 4 in light of the equations above, it is now understood that it is insufficient for achieving polarization independence to merely overlap light hole and heavy hole peaks for the different polarizations. This is understandable from the observation that the respective light hole and heavy hole transition peaks have different oscillator strengths. In order to balance out the difference in oscillator strengths, it is desirable to increase the tensile strain so that the heavy hole exciton transition (larger oscillator strength in TE shown in FIGS.) is moved to higher energy.

For the quantum well waveguide shown in FIGS. 1 and 2 realized in accordance with the principles of the present invention and from the description above, it should now be clear to those skilled in the art that the mole fraction of x substantially equal to 0.3 for the material composition InGaAs is suitable for achieving polarization independent operation at an operating wavelength of 1.55 microns (incident photon energy equal to 0.8 eV).

Tuning the waveguide structure for a particular incident photon energy or wavelength is accomplished by utilizing the particular material composition, the mole fraction to induce strain in the quantum well, and by utilizing the thickness of the quantum well layer to vary the bandgap of the waveguide. With respect to the latter point, it is understood by those skilled in the art that the thickness of the quantum well can be varied to cause the lowest Eigenstates to be shifted to higher or lower energy. As a result of narrowing the quantum well thickness, it should be noted that the light and heavy hole subbands are shifted farther apart (with respect to energy).

Generally semiconductor waveguides are fabricated in a particular rectangular geometry, that is, slab, rib, buried rib or otherwise. The transverse dimensions of the waveguide are such that standard waveguides have a larger horizontal transverse dimension than the vertical transverse dimension. Dimensions of the waveguide are considered when determining the effective optical properties for the orthogonal polarizations propagating in the waveguide. That is, the effective refractive index for the vertical transverse polarization (TM) is a function of the index of refraction in the strained core waveguiding region including the quantum wells and barriers as well as the indices for the upper and lower cladding regions. Similarly, the effective refractive index for the horizontal transverse polarization (TE) is a function of the index of refraction in the strained core waveguiding region as well as the indices for lateral confinement regions adjacent to the sides of the strained core waveguiding region.

While electrical means have been shown for controlling the electrooptic properties of the waveguide, it is contemplated that other methods and apparatus for controlling these properties may include optical pump sources, application of external electric field, and transfer of carriers, all of which are well known to those skilled in the art.

It is understood that, while the material system GaAs/InGaAs is described above for fabricating the semiconductor device having the asymmetric quantum well region, other material combinations may be selected from other semiconductor Group III-V systems such as GaAs/AlGaAs, AlGaAs/InGaAs, GaAs/AlAs, InGaAs/InAlAs, GaAs/InAs, InGaAs/InGaAlAs, GaAsSb/GaAlAsSb and InGaAsP/InP. Finally, extension of the device structures is also contemplated to binary, ternary and quaternary compounds from Group II-VI, Group II-VI/Group IV, and Group III-V/Group IV semiconductor compounds.

While the principles of the present invention have been described in terms of a waveguide device having an intrinsic or nominally undoped waveguiding region, it is understood that the principles of the invention extend with equal force to waveguide devices in which the waveguiding region includes doped layers together with the quantum wells. See, for example, the descriptions of a BRAQWET waveguide device in U.S. patent application Ser. No. 322,958 (Bar-Joseph et al. Case 5-10-22), which is expressly incorporated herein by reference, and in *Applied Physics Letters*, 56 (20), pages 1951-3, (1990).

I claim:

1. A semiconductor device comprising a guided wave structure for supporting propagation of a lightwave signal having an incident mean photon energy and a quantum well structure including at least first and second barrier layes and a quantum well layer therebetween, wherein said barrier layers have lattice constants which are substantially different from a lattice constant for the quantum well layer in order to produce a lattice mismatch condition, said quantum well structure having a predetermined optical property which exhibits a first characteristic for a first optical polarization of the lightwave signal and a second characteristic for a second polarization of the lightwave signal, and said guided wave structure including said quantum well structure, the quantum well layer being substantially parallel to a propagation axis through the guided wave structure for the lightwave signal, characterized in that, the quantum well structure has a lattice mismatch which yields a first sum of ratios which is substantially equal to a second sum of ratios, each sum of ratios being proportional to a combination of oscillator strength versus wavelength detuning substantially at each of a heavy hole exciton resonance peak and light hole exciton resonance peak for the predetermined optical property, said detuning being relative to the incident mean photon energy, said incident mean photon energy being less than an absorption bandedge energy for said quantum well structure, said oscillator strength and detuning for the first sum of ratios being related to the first characteristic and said oscillator strength and detuning for the second sum of ratios being related to the second characteristic.

2. The semiconductor device as defined in claim 1 wherein said predetermined optical property includes at least one selected from the group consisting of index of refraction and optical absorption.

3. The semiconductor device as defined in claim 2 wherein said quantum well structure includes material compositions selected from the group of binary, ternary, and quaternary compounds for Group III-V and Group II-VI elements.

4. A semiconductor device comprising a guided wave structure for supporting propagation of a lightwave signal having an incident mean photon energy and a quantum well structure including at least first and second barrier layers and a quantum well layer therebetween, wherein said barrier layers have lattice constants which are substantially different from a lattice constant for the quantum well layer in order to produce a lattice mismatch condition, said quantum well structure having predetermined optical and electrooptic properties each of which exhibit a first characteristic for a first optical polarization of the lightwave signal and a second characteristic for a second polarization of the lightwave signal, and said guided wave structure including said quantum well structure, the quantum well layer being substantially parallel to a propagation axis through the guided wave structure for the lightwave signal, characterized in that, the quantum well structure has a lattice mismatch which yields a first sum of ratios which is substantially equal to a second sum of ratios, each sum of ratios being proportional to a combination of oscillator strength versus wavelength detuning substantially at each of a heavy hold exciton resonance peak and light hole exciton resonance peak for the predetermined optical and electrooptic properties, said detuning being relative to the incident mean photon energy, said incident means photon energy being less than an absorption bandedge energy for said quantum well structure said oscillator strength and detuning for the first sum of ratios being related to the first characteristic and said oscillator strength and detuning for the second sum of ratios being related to the second characteristic, and the semiconductor device further comprises means for varying at least one of said electrooptic properties of said quantum well structure.

5. The semiconductor device as defined in claim 4 wherein the means for varying includes means for applying an electromagnetic field to said quantum well structure.

6. The semiconductor device as defined in claim 4 wherein said predetermined electrooptic property includes at least one selected from the group consisting of gain, index of refraction, and optical absorption.

7. The semiconductor device as defined in claim 4 wherein said quantum well structure includes material compositions selected from the group of binary, ternary, and quaternary compounds for Group III-V and Group II-VI elements.

8. The semiconductor device as defined in claim 3 wherein the barrier layers include InP and the quantum well layer includes $In_xGa_{1-x}As$, for mole fraction x between 0 and 1.

9. The semiconductor device as defined in claim 8 wherein the mole fraction x is substantially equal to 0.3 and the incident mean photon energy for the lightwave signal is substantially equal to 0.8 mev.

10. The semiconductor device as defined in claim 7 wherein the barrier layers include InP and the quantum well layer includes $In_xGa_{1-x}As$, for mole fraction x between 0 and 1.

11. The semiconductor device as defined in claim 10 wherein the mole fraction x is substantially equal to 0.3 and the incident mean photon energy for the lightwave signal is substantially equal to 0.8 mev.

* * * * *